(12) United States Patent
Bottomley (10) Patent No.: US 6,442,154 B1
(45) Date of Patent: Aug. 27, 2002

(54) METHOD AND APPARATUS FOR SUCCESSIVE CANCELLATION USING MULTIPLE SIGNAL TIMINGS

(75) Inventor: Gregory E. Bottomley, Cary, NC (US)

(73) Assignee: Ericsson Inc., RTP, NC (US)

( * ) Notice: Subject to any disclaimer, the term of this patent is extended or adjusted under 35 U.S.C. 154(b) by 0 days.

(21) Appl. No.: 09/292,224

(22) Filed: Apr. 15, 1999

(51) Int. Cl.[7] .......................... H04B 7/216; H04B 1/10; H04J 1/00
(52) U.S. Cl. .................. 370/342; 370/335; 375/147; 375/150; 455/63
(58) Field of Search ................. 370/335, 342; 375/147, 150; 455/67.3, 222, 223, 63

(56) References Cited

U.S. PATENT DOCUMENTS

| | | | |
|---|---|---|---|
| 5,151,919 A | 9/1992 | Dent | 375/1 |
| 5,615,209 A | 3/1997 | Bottomley | 370/342 |
| 6,005,506 A * | 12/1997 | Bazarjani et al. | 341/143 |
| 6,128,332 A * | 12/1997 | Fukawa et al. | 375/146 |

FOREIGN PATENT DOCUMENTS

| | | | | |
|---|---|---|---|---|
| GB | 2 166 021 A | * | 4/1988 | H04N/7/12 |

* cited by examiner

Primary Examiner—Edward F. Urban
Assistant Examiner—Meless N Zewdu
(74) Attorney, Agent, or Firm—Gregory A. Stephens, P.C.

(57) ABSTRACT

A direct sequence CDMA receiver receives a sampled signal. A subsampling unit sub-samples the sampled signal in accordance with timing information to produce a chip-sampled signal. An equivalent code generator generates equivalent codes using the timing information and information about user spreading codes. A processor processes the equivalent codes to produce an orthogonalized code and a correlator correlates the chip sampled signal with the orthogonalized code to produce a despread value.

42 Claims, 7 Drawing Sheets

METHOD AND APPARATUS FOR SUCCESSIVE CANCELLATION USING MULTIPLE SIGNAL TIMINGS

FIELD OF THE INVENTION

This invention relates to a direct sequence CDMA receiver and, more particularly, for demodulating using one sample per chip to reduce receiver complexity.

BACKGROUND OF THE INVENTION

Wireless communications has been expanding at a phenomenal rate, as more radio spectrum becomes available for commercial use and as cellular phones become commonplace. Technology is currently evolving from analog communications to digital communications. Speech is represented by a series of bits. The bits are modulated and transmitted between a base station and a mobile station. Each of the base station and mobile station has a transmitter and a receiver. The receiver demodulates the received wave form to recover the bits, which are then converted back into speech. There is also a growing demand for data services, such as e-mail and Internet access, which require digital communications.

There are numerous types of digital communication systems presently available. Frequency-division multiple access (FDMA) divides the spectrum into plurality of radio channels corresponding to different carrier frequencies. These carrier frequencies may be further divided into time slots, referred to as time-division multiple access (TDMA) as is known in the D-AMPS, PDC and GSM digital cellular systems. Alternatively, if the radio channel is wide enough, then multiple users can use the same channel using spread spectrum techniques and code-division multiple access (CDMA).

Direct sequence (DS) spread spectrum modulation is commonly used in CDMA systems. Each information symbol is represented by a number of "chips". Representing one symbol by many chips gives rise to "spreading", as the latter typically requires more bandwidth to transmit. The sequence of chips is referred to as the spreading code or signature sequence. The code has a chip rate that is higher than the bit rate of the information signal. At the receiver, the received signal is despread using a despreading code, which is typically the conjugate of the spreading code. IS-95 and J-STD-008 are examples of DS-CDMA standards.

Coherent rake reception is commonly used with coherent DS-CDMA systems. The received signal is despread by correlating to the chip sequence, and the spread value is weighted by the conjugate of a channel coefficient estimate, removing the phase rotation of the channel and weighting the amplitude to indicate a softer confidence value. When multi-path propagation is present, the amplitude can vary dramatically. Multi-path propagation can also lead to time dispersion, which causes multiple, resolvable echoes of the signal to be received. Correlators are aligned with the different echos. Once the despread values have been weighted, then they are summed. This weighting and summing operation is commonly referred to as rake combining.

Modulation schemes which allow non-coherent demodulation may be used in DS-CDMA systems. For example, differentially encoded phase may be used, such as DPSK, allowing differential detection at the receiver. Also, as in the IS-95 uplink, M'ary orthogonal modulation may be used, allowing non-coherent detection at the receiver. The advantage of non-coherent detection is that channel estimation is not needed. Channel estimation may be difficult due to how fast the channel changes or how noisy the signal is. With non-coherent detection, rake combining of detection values corresponding to different echoes can still be performed to gain path diversity. Combining signals from different antennas is also possible.

Figure 1:
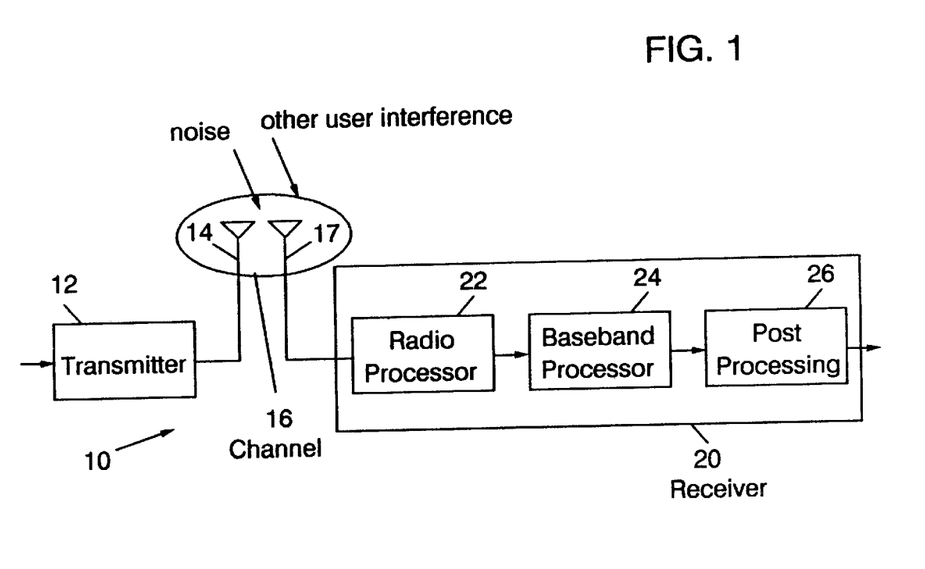
FIG. 1 is a block diagram of a general digital communication system.

Referring to FIG. 1, a digital communications systems 10 is illustrated. Digital symbols are provided to a transmitter 12. The transmitter 12 maps the symbols into a representation appropriate for the transmission medium or channel 16, such as a radio channel, and couples the signals to the transmission medium via an antenna 14. The transmitted signal passes through the channel 16 and is received at an antenna 18. The received signal is passed to a receiver 20. The receiver 20 uses a radio processor 22, a baseband processor 24, and a post-processing unit 26.

The radio processor 22 tunes to the desired band and desired carrier frequency and amplifies, mixes and filters the received signal down to baseband. The signal is sampled and quantized, ultimately providing a sequence of baseband received samples. Since the original radio signal has in-phase (I) and quadrature (Q) components, the baseband samples typically have I and Q components, giving rise to complex baseband samples. The baseband processor 24 detects the digital signals that were transmitted. It may also produce soft information, which gives information regarding the likelihood of the detected symbol values. The post processing unit 26 performs functions that depend on the particular communications application. For example, it may use the soft detected values to perform forward error correction decoding or error detection decoding. It may convert digital symbols into speech using a speech decoder.

The performance of DS-CDMA systems is limited by interference from other users. The despreading operation provides some degree of interference suppression, allowing multiple users to overlap in time and frequency. However, the capacity is limited. To improve receiver performance, interference cancellation has been used. One approach is successive cancellation of interference in which users are detected and subtracted in signal strength order, starting with the strongest user. Ideally, subtraction is based on the user's symbol value and channel response information, referred to as coherent successive cancellation. In practice, the symbol value may be unreliable and the channel response may be unknown. A form of non-coherent cancellation can be used, as described in U.S. Pat. No. 5,151,919, assigned to the assignee of the present application, the specification of which is incorporated by reference herein. In this patent the despread value is used for signal subtraction rather than channel information.

Figure 2:
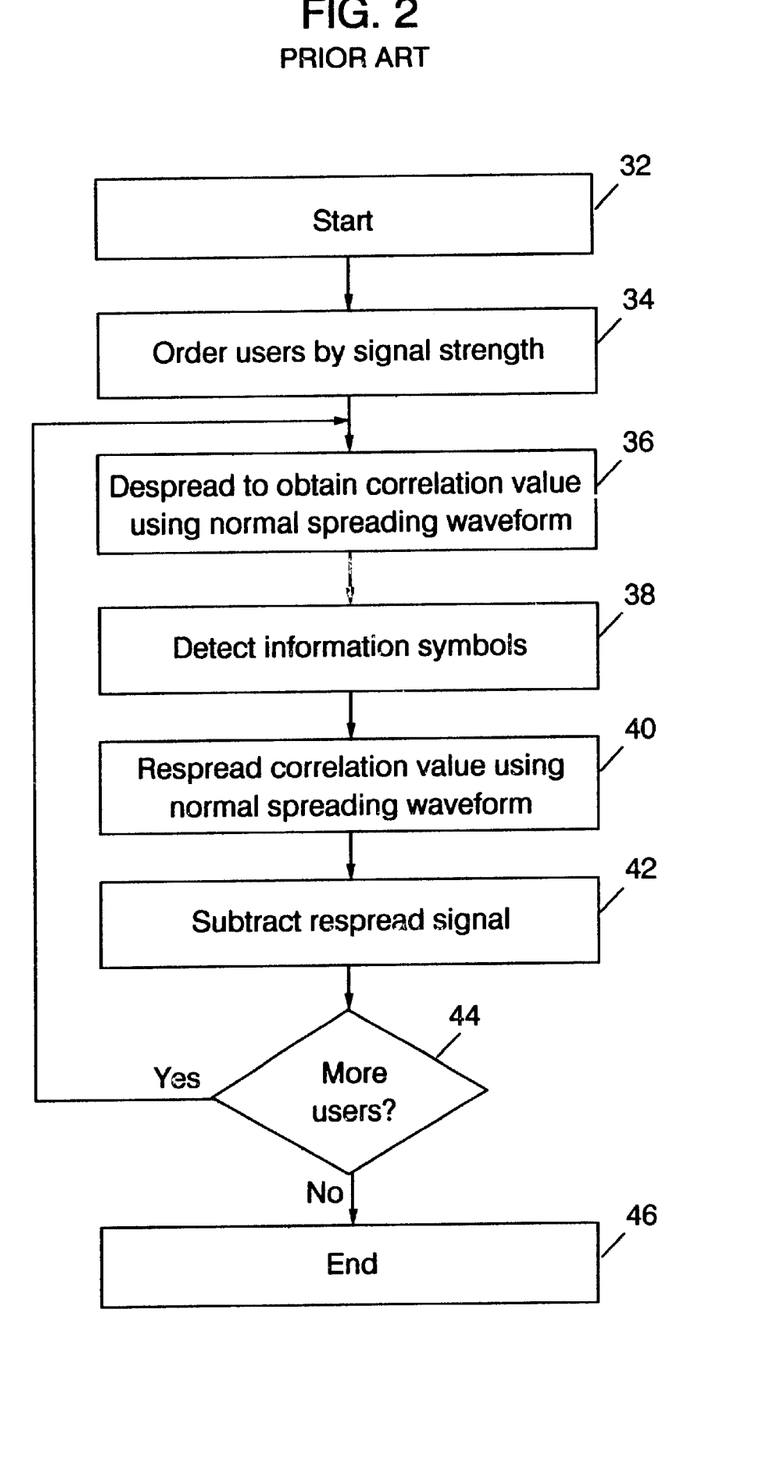
FIG. 2 is a flow chart illustrating a prior art method of baseband processing.

With reference to FIG. 2, a prior art method of non-coherent successive cancellation is illustrated. The method begins at a block 32. At a block 34, user signals are ordered by signal strength. Signals may be ordered as described in U.S. Pat. No. 5,151,919. For each user, starting with the strongest, despreading is performed to obtain correlation value using normal spreading waveforms at a block 36. These correlation values are used to detect the information symbols at block 38. The correlation values are respread using the normal spreading waveform at block 40, and the respread signal is subtracted from the composite received signal at a block 42. A decision block 44 determines whether more users need to be demodulated. If so, then the processing returns to the block 36. If not, the routine ends at a block 46.

While non-coherent successive cancellation improves performance, there is a relatively high error floor when plotting performance versus signal-to-noise ratio. This factor is analyzed in P. Patel and J. Holtzman, "Analysis of A Simple Successive Interference Cancellation Scheme In A DS/CDMA System," *IEEEJ SeL Areas Commun.*, vol. 12, pp. 796–807, June 1994. This shows that interference from previously canceled users is not entirely eliminated.

Figure 3:
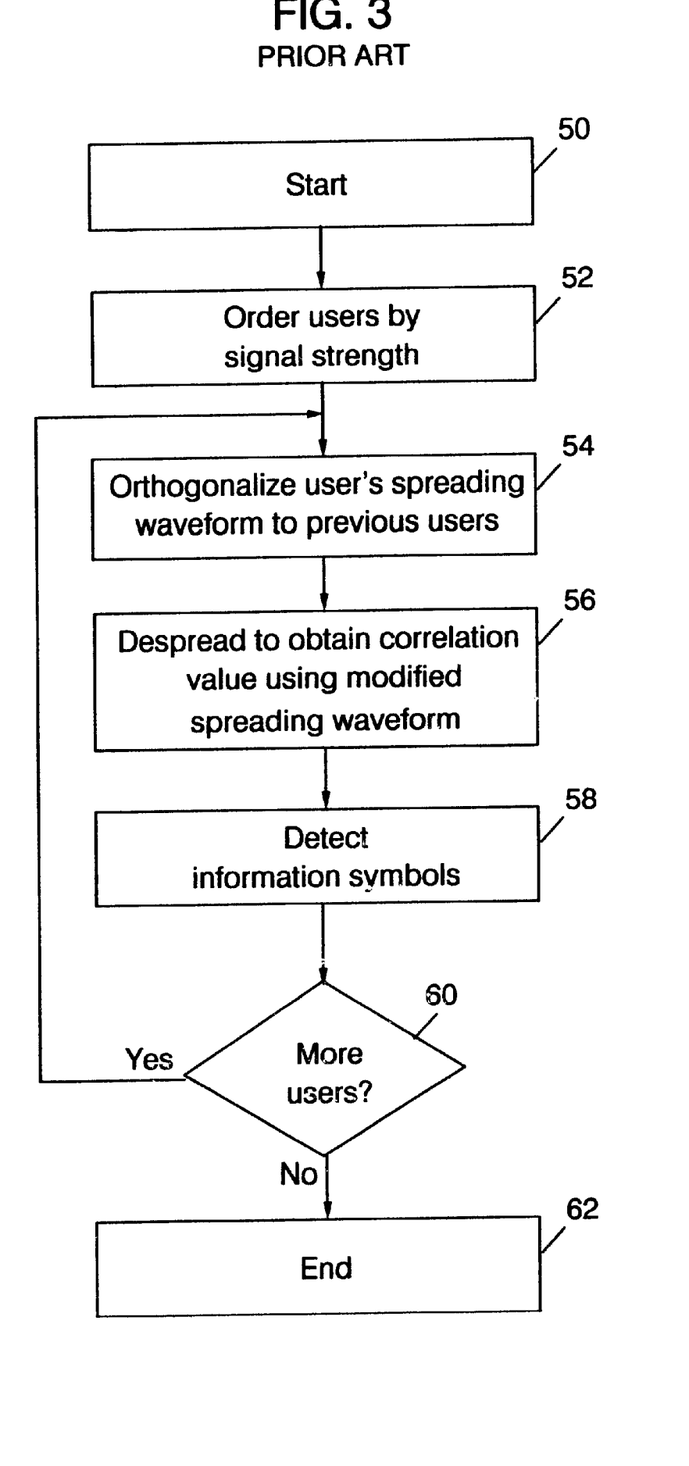
FIG. 3 is a flow chart illustrating another prior art method of baseband processing.

The performance of non-coherent successive cancellation can be improved by accounting for how each cancellation step affects the remaining signals. One approach is to use signal orthogonalization, which is described in U.S. Pat. No. 5,615,209, assigned to the assignee of the above application, which is incorporated by reference herein. This approach is initially described for signals which are synchronized in time. Orthogonalization is performed using the spreading sequences of the different users. In one embodiment, the method in U.S. Pat. No. 5,615,209 is similar to that shown in FIG. 2 herein, except that respreading uses a modified sequence instead of the normal sequence. The modified sequence is obtained by applying the Gram-Schmidt orthogonalization process to the user's spreading sequences. In another embodiment the steps of respreading and subtracting are eliminated. Instead, despreading is performed using a modified sequence rather than the normal sequence. This embodiment is illustrated in the flow chart of FIG. 3 herein. The method starts at a block 50. At a block 52, users are ordered by signal strength. For each user, starting with the strongest, the user's spreading waveform is orthogonalized with respect to previous user's spreading waveforms to produce a modified spreading waveform at a block 54. The modified spreading waveform may be obtained from the Gram-Schmidt process as described in U.S. Pat. No. 5,615,209. The modified spreading waveform is used at a block 56 to despread the user of interest, producing correlation values. These correlation values are used to detect information symbols at a block 58. A decision block 60 determines if there are more users to be demodulated. If so, then control returns to the block 54. If not, then the process ends at a block 62.

Figure 4:
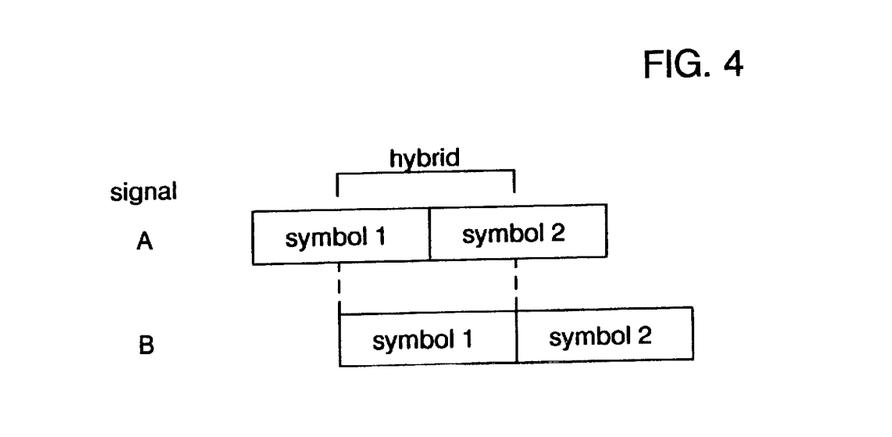
FIG. 4 is a timing diagram illustrating an example of asynchronous signals.

U.S. Pat. No. 5,615,209 also discusses orthogonalization for asynchronous signals. An example of asynchronous users is illustrated in FIG. 4. For asynchronous signals, the formation of a hybrid sequence is formed for use in orthogonalization. For the example in FIG. 4, user B's spreading sequence for symbol 1 is orthogonalized with a hybrid sequence that is a combination of part of user 1's detected symbol 1 and part of user 1's detected symbol 2, such that the hybrid sequence is aligned with user 2's symbol 1. With asynchronous signals, the time of arrival for each signal is different. The difference in arrival times can be fractions of a chip period. As a result, it is common to sample the signal multiple times per chip period so that one of the sampling instances corresponds to the center of a chip for a given signal. When using the method in U.S. Pat. No. 5,615,209 with multiple samples per chip, each signature sequence is a sampled version of the spreading waveform used at the transmitter. However, orthogonalization using multiple samples per chip increases complexity significantly.

The present invention is directed to overcoming one or more of the problems discussed above in a novel and simple manner.

SUMMARY OF THE INVENTION

In accordance with the invention, non-coherent and coherent successive cancellation are performed efficiently by canceling interference using different chip timing values. This allows each signal to be processed with only one sample per chip, reducing receiver complexity and battery or power supply drain.

In one aspect of the invention, there is provided a direct sequence CDMA receiver including means for receiving a sampled signal. Means are provided for sub-sampling the sampled signal in accordance with timing information to produce a chip-sampled signal. Means generate equivalent codes using the timing information and information about user spreading codes. Means are provided for processing the equivalent codes to produce orthogonalized codes and means correlate the chip sampled signal with the orthogonalized codes to produce despread values.

It is a feature of the invention that the generating means comprises means for interpolating user spreading codes.

It is another feature of the invention that the generating means comprises means for concatenating codes in different symbol periods using detected symbol values.

It is another feature of the invention that the processing means includes a Gram-Schmidt processor.

It is still another feature of the invention that the correlating means comprises means for correlating two component codes to produce component correlations and means for combining component correlations to produce the despread values.

It is still a further feature of the invention that the correlating means produces plural despread values and further comprising means for combining despread values to produce combined despread values.

It is an additional feature of the invention that the combining means corresponds to combining despread values from different signal echoes.

It is still a further feature of the invention that the combining means corresponds to combining the despread values from different antennas.

It is still an additional feature of the invention that the generating means generates equivalent codes corresponding to different echoes of a user's signal.

There is disclosed in accordance with another aspect of the invention a direct sequence CDMA receiver including means for receiving a sampled signal. Means are provided for sub-sampling the sampled signal in accordance with timing information to produce a chip-sampled signal. Means store the chip-sampled signal to produce a buffered signal. Means correlate the buffered signal with spreading codes to produce despread values. Means are provided for generating equivalent codes using the timing information and information about user spreading codes. The equivalent codes are processed to produce orthogonalized codes. Means are provided for spreading the despread values using the orthogonalized codes to produce respread signals. Means are provided for subtracting the respread signals from the buffered signal to produce an updated buffered signal.

There is disclosed in accordance with yet another aspect of the invention the method of detecting transmitted symbols in a direct sequenced CDMA receiver comprising the steps of receiving a sampled signal; sub-sampling the sampled signal in accordance with timing information to produce a chip-sampled signal; generating equivalent codes using the timing information and information about user spreading codes; processing the equivalent codes to produce orthogonalized codes; and correlating the chip sampled signal with the orthogonalized codes to produce despread values.

Further features and advantages of the invention will be readily apparent from the specification and from the drawings.

DETAILED DESCRIPTION OF THE INVENTION

In accordance with the invention, the digital communication system 10 of FIG. 1 is configured with the baseband processor 24 utilizing timing of received sample signals to produce chip-sampled signals for processing. Particularly, the sampled signal is sub-sampled using timing information related to a signal of interest to produce a chip-sampled signal. Equivalent codes are generated using the timing information and stored information about user spreading codes. The equivalent codes are processed to produce orthogonalized codes. The chip sampled signal is then correlated with orthogonalized codes to produce despread values.

In another aspect of the invention, the chip-sampled signals are stored to produce a buffered signal. The buffered signals are correlated with spreading codes to produce despread values. Despread values are spread using orthogonalized codes to produce respread signals which are subtracted from the buffered signals to produce an updated buffered signal.

For wireless digital communication systems, as illustrated in FIG. 1, the transmitter 12 emits electromagnetic waveforms from the antenna 14. The medium in the form of the channel 16 is the radio propagation environment. The receiver 20 employs one or more antennas 18 to recover the transmitted signal. The present invention is described in the context of radio communication. However, the invention is not intended to be limited to such systems. Indeed, the concepts of the invention are readily applicable to wireline communications and magnetic storage systems. In such applications, the radio processor is generalized to a device that extracts data from the transmission or storage medium.

Figure 5:
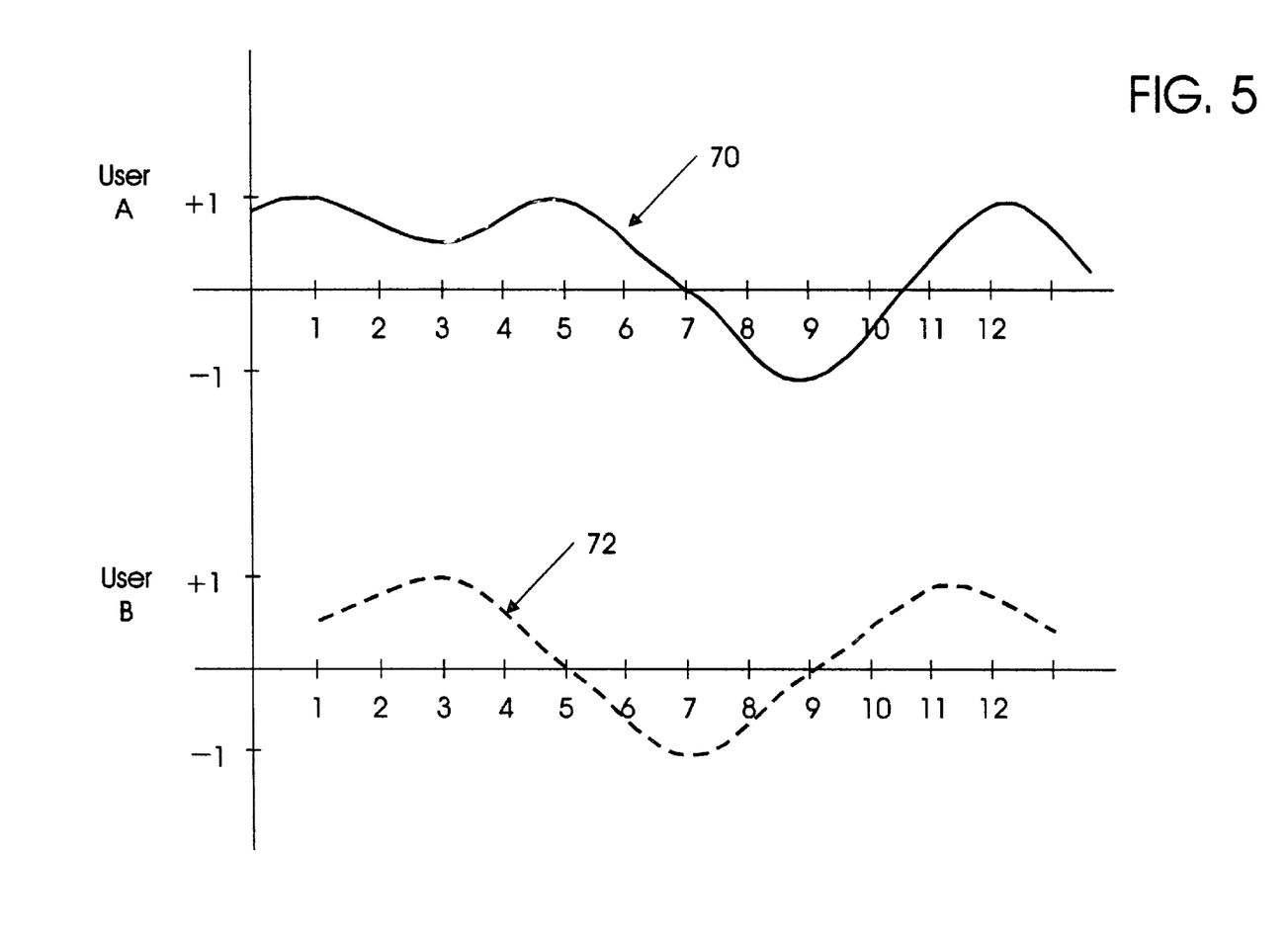
FIG. 5 is a series of curves illustrating another example of asynchronous signals.

With reference to FIG. 5, additional examples of asynchronous signals are illustrated. The signals are referred to throughout this application for discussing the present invention.

FIG. 5 illustrates a first curve 70 in solid line labeled for "user A". There is also a second curve 72 labeled for a "user B". For discussion herein, the signals for user A and user B are sampled at a rate of four samples per chip period. The spreading waveforms consist of +1 or −1 value chips with a smooth chip pulse shape in-between. Using conventional correlation receivers without interference cancellation, the received signal for user A might be sub-sampled, for example, at sample times 1, 5, 9, etc. For user B, the received signal might be sub-sampled at, for example, sample times 3, 7, 11, etc. In accordance with the invention, interference cancellation is applied using the different timings of the different user signals. When detecting a particular signal, referred to as the "signal of interest", cancellation of other, usually stronger, signals is based on the timing of the signal of interest. For example, if user B is the signal of interest, then the signal for user A must be canceled prior to detecting the signal for user B. Only the sample timing of user B is utilized, so that only samples 3, 7, 11, etc. are processed for user B. For this set of samples, an equivalent user A sequence is formed. This is formed by noting user A's sequence at its own timing, i.e., samples 1, 5, 9, etc., and interpolating to obtain values at sample times 3, 7, 11 etc. In the example of FIG. 5, the values for user B at sample timings 3, 7 and 11 is +1, −1, and +1, respectively. The timing of user A's sequence at its timings 1, 5, 9, and 13 is +1, +1, −1, and +1, respectively. The equivalent user A sequence at times 3, 7 and 11, is determined to be 0.5, 0 and 0.5, respectively. Preferably, interpolation is based on the transmit chip pulse shaping and the receive filtering. This equivalent sequence is then used in the Gram-Schmidt orthogonalization procedure described in U.S. Pat. No. 5,615,209, incorporated by reference herein, to generate a modified user B sequence. In one embodiment of the invention, this modified user B sequence is used for despreading.

Figure 6:
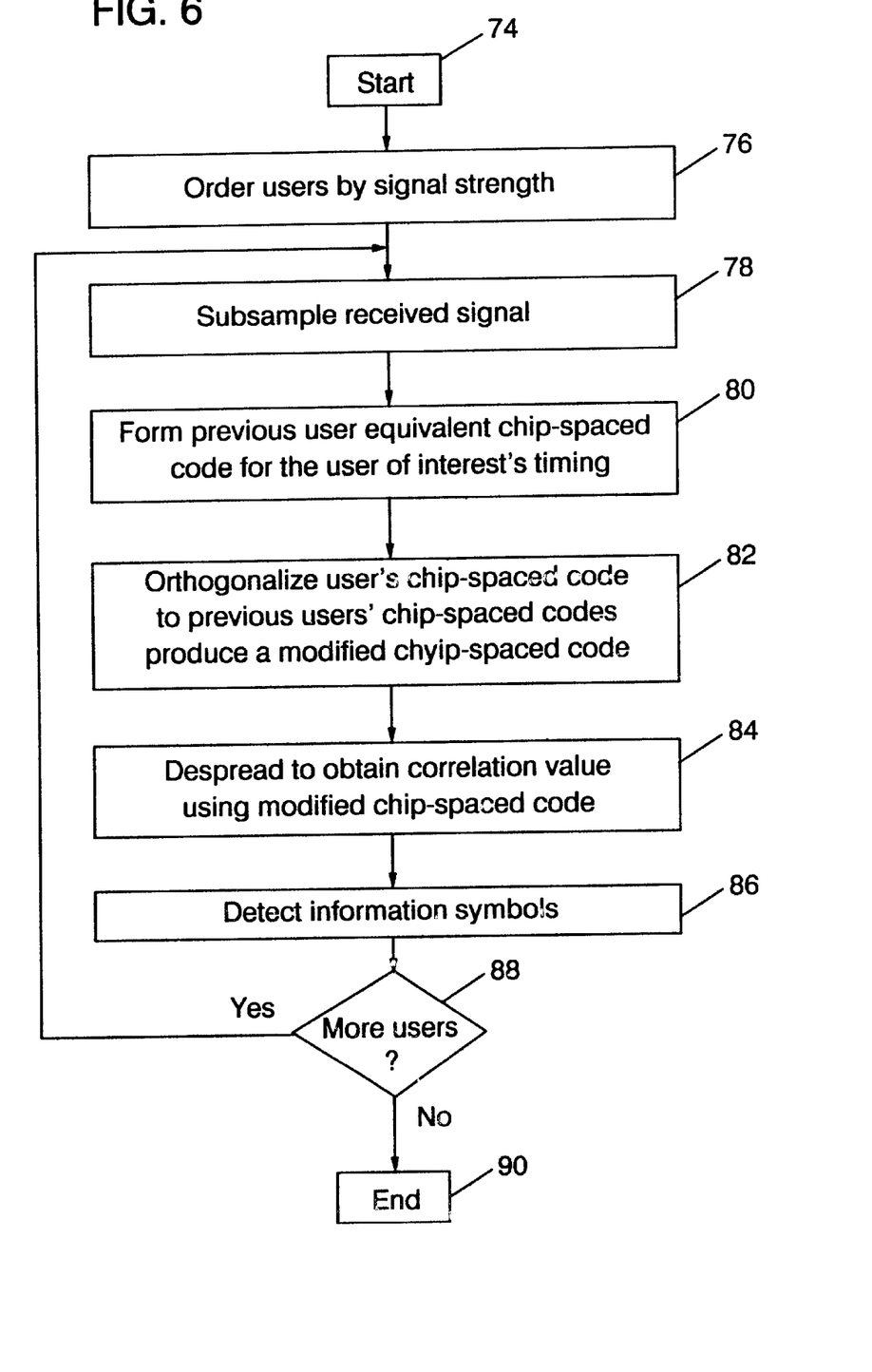
FIG. 6 is a flow chart illustrating a method of baseband signal processing according to one embodiment of the invention.

A method to be implemented by the baseband processor 24 in accordance with the invention is illustrated in the flow chart of FIG. 6. The method begins at a block 74 and proceeds to a block 76 which orders user signals by signal strength. Processing is then implemented from the strongest signal to the weakest signal. The oversampled receive signal is sub-sampled to one sample per chip according to the timing of the user being processed at block 78. For example, if signal A is the stronger signal, then the timing of signal A is used. For the user being processed, equivalent chip-spaced codes are formed corresponding to the user being processed and the stronger users at the timing of the user being processed at a block 80. The equivalent code for the user being processed is the normal spreading code for that user. The equivalent code for the others depends on the relative timing of the other users with respect to the user being processed. At a block 82 the equivalent codes are orthogonalized using, for example, the Gram-Schmidt procedure, as discussed above. The orthogonalized code for the user being processed is then correlated to the received signal to produce correlation or despread values at a block 84. The despread values are used to detect information symbols at a block 86. A block 88 determines if more user signals need to be demodulated. If so, then processing returns to the block 78. If not, then the routine ends at a block 90.

If the same spreading code is used for each symbol period, then the result obtained at the block 80 can be stored for use in subsequent symbol periods. Otherwise, the entire process is repeated for each user symbol to be demodulated.

Figure 7:
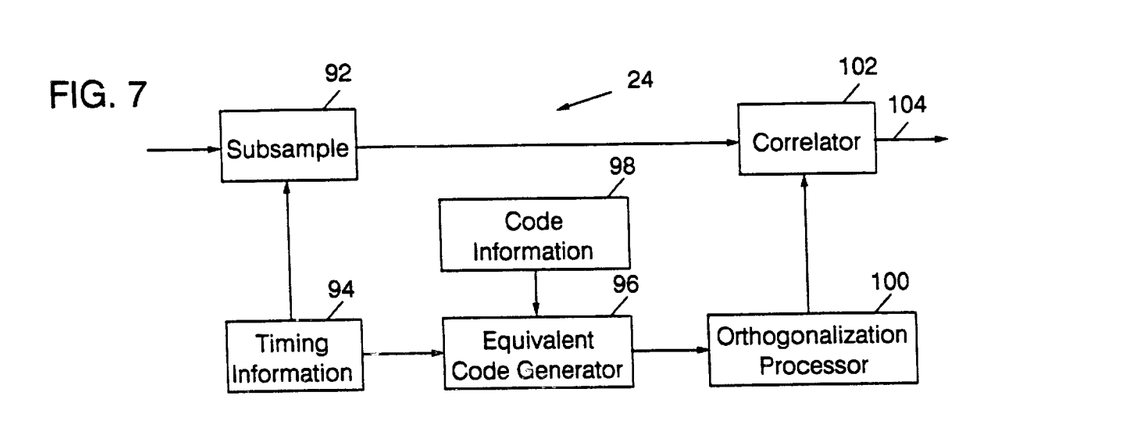
FIG. 7 is a block diagram illustrating a baseband processor for implementing the method of FIG. 6.

Referring to FIG. 7, a block diagram illustrates the baseband processor 24 according to the invention. A sub-sample unit 92 receives the over-sampled signal and produces a chip-based received signal at one sample per chip. A timing information generator 94 is connected to the sub-sample unit 92 and is used to determine which samples are kept. The timing information generator 94 is also connected to an equivalent code generator 96. The equivalent code generator 96 receives code information for different users from a code information unit 98. The equivalent code generator 96 then produces equivalent codes for the user being processed and the stronger users at the timing of the user of interest. The equivalent codes can be formed by concatenating partial codes from different symbol periods, or by multiplying one or more of the partial codes with detected symbols values, as described in U.S. Pat. No. 5,615,290, incorporated by reference herein. The equivalent code of the user of interest is the user of interest's spreading code, one sample per chip, for the symbol period being considered. These equivalent codes are provided to an orthogonalization processor 100. The orthogonalization processor 100 applies an orthogonalization process to produce an orthogonalized code for the user being processed. The orthogonalized processor 100 and the sub-sample unit 92 are connected to a correlator 102. The correlator 102 correlates the chip-sampled signal to the code to produce a despread value on a line 104 for the user being processed.

The process implemented in the block diagram of FIG. 7 is repeated, starting with the strongest user and ending with the last user of interest. This utilizes multiple stage processing as shown in FIG. 2 of U.S. Pat. No. 5,615,209.

The orthogonalized code generated by the orthogonalization processor 100 may be expressed as a weighted sum of normal user codes. Thus, the normal user codes are components of the orthogonalized code. To simplify correlation, the correlator 102 may correlate to the component codes separately, then combine the results using weighting to produce the despread values.

The equivalent codes are formed by concatenating codes from different symbol periods and scaling by detected values. Detected values may be obtained from despread values directly or after forward error correction decoding. For DPSK applications, scaling of only one of the symbol periods is needed, using the detected DPSK symbol. If the detected values are unreliable, then multiple equivalent codes can be generated, corresponding to different possible detected values.

Timing information can be obtained using any conventional approach to timing estimating, as is apparent to those skilled in the art. For example, correlations to user sequences at different time lags can be used to search for a peak correlation, indicating a time of arrival for that user.

In the embodiment of FIGS. 6 and 7, orthogonalization is used to despread the chipsampled received signal with a better despreading code. In accordance with an alternative embodiment, orthogonalization is used to cancel users in the received signal prior to despreading using the normal despreading code. For example, the equivalent user A sequence is used to null energy associated with user A at the timing of user B. Then user B's signal can be despread using its normal despreading sequence with one sample per chip.

Figure 8:
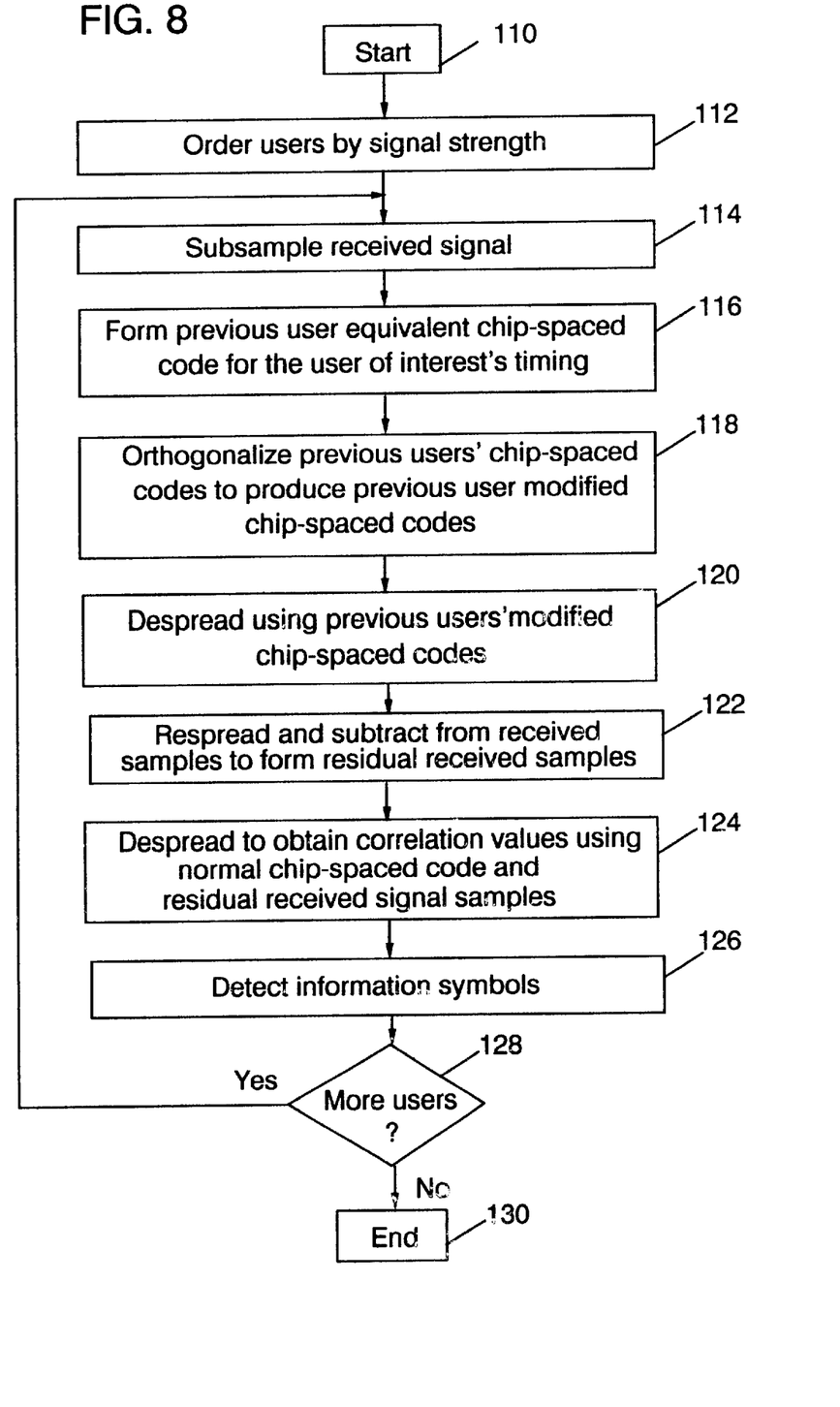
FIG. 8 is a flow diagram illustrating an alternative method for baseband signal processing according to the invention.

Referring to FIG. 8, a flow diagram illustrates a method implemented in the baseband processor 24 for the alternative embodiment of the invention. This method begins at a start block 110. The signals are then ordered by signal strength at a block 112 and the received signals are sub-sampled at a block 114. As above, processing proceeds from the strongest user to the weakest user. For the user being processed, equivalent chip-spaced codes are formed corresponding to stronger users at the timing of the user being processed at a block 116. These equivalent codes are then orthogonalized using, for example, the Gram-Schmidt procedure, at a block 118. At a block 120, despreading is performed for each of the stronger users. The despreading is formed using the equivalent chip-spaced codes or the orthogonalized codes. The resulting despread values are respread using the orthogonalized codes and subtracted from the chip-spaced received signal to receive a residual received signal at a block 122. Despread values corresponding to the user being processed are formed at block 124 using the normal spreading code of the user being processed and the residual received signal. The information symbols are then detected at a block 126. A decision block 128 determines if more user signals need to be demodulated. If so, then processing returns to the block 114. If not, then the processing ends at a block 130.

Figure 9:
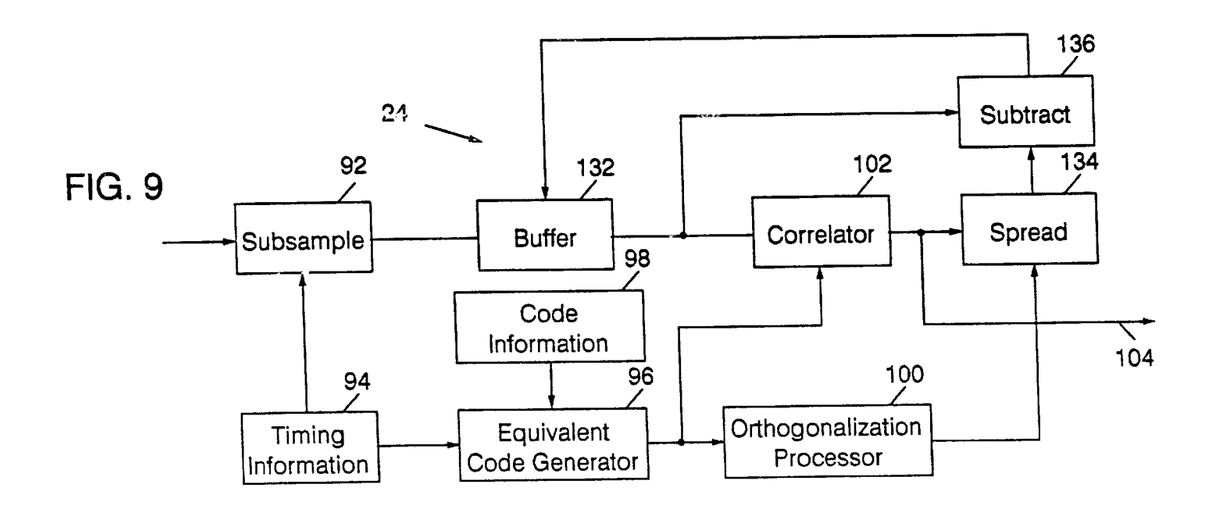
FIG. 9 is a block diagram illustrating a baseband processor for implementing the method of FIG. 8.

Referring to FIG. 9, a block diagram for the baseband processor 24 according to the alternative embodiment of the invention is illustrated. For simplicity, elements corresponding to those in FIG. 7 are illustrated with like reference numerals.

The sub-sample unit 92 is connected to a buffer 132 that buffers the chip-spaced received signal. The buffered signal from the buffer 132 is provided to the correlator 102. The correlator 102, instead of being connected to the orthogonalization processor 100, as in FIG. 7, receives the output of the equivalent code generator 96. The correlator 102 correlates an equivalent code with the buffered signal to produce a correlation. The correlation is then provided to a spreader 134, where it is spread using an orthogonalized code from the orthogonalization processor 100 to produce a respread signal. The respread signal is provided to a subtractor 136 along with the buffered signal from the buffer 132. The respread signal is then subtracted from the buffered signal to produce an updated buffer signal which is stored in the buffer 132.

As is apparent, the correlator 102 could use the output of the orthogonalization processor, rather than the output of the equivalent code generator 96, in accordance with the invention.

The process of correlating, spreading, and subtracting is repeated for all stronger user signals. The correlator 102 is then used to correlate the updated buffer signals from the buffer 132 with the spreading code of the user of interest provided by the code information generator 98 to produce the despread values for the user being processed. This process may be repeated, starting with the strongest user and ending with the last user of interest.

The concepts of the present invention may be used in the presence of signal echoes, as will be apparent to those skilled in the art. When detecting a user signal, energy from multiple echoes is rake combined, preferably using non-coherent rake combining. For example, for DPSK modulation, the correlations for each echo are passed through a differential detector, then summed over all signal echoes of the same symbol. The sign of the result gives the detected DPSK bit value. In the orthogonalization process, each echo is treated as a separate signal. Thus, if each user has two echoes, then detection of user M would be made orthogonal to 2(M−1) equivalent chip-spaced codes.

The receiver in accordance with the invention may also utilize multiple receive antennas, as is apparent. Signals from different antennas are combined similar to rake combining, prior to detection. Orthogonalization occurs on each antenna separately.

The concepts of the present invention can also be used in conjunction with discontinuous transmission (DTX). If a user signal is known to be in DTX mode, i.e., transmission inhibited, then detection and orthogonalization with respect to that signal can be omitted. The DTX signal may not be known until after detection and possibly decoding. One approach is to not exploit DTX, and simply orthogonalize assuming the signal is present. Later, the same data can be demodulated again, taking advantage of knowing the DTX state of each user, eliminating unnecessary orthogonalization steps.

The use of multiple timings and one sample per chip processing, as described above, can also be used with coherent successive cancellation. When subtracting each user, the subtractions only occur for sampling phases of remaining users of interest.

While the invention may be described in the context of signal strength ordering, the invention may be applied with any type of signal grouping. Instead of canceling stronger signals, the present invention may be applied to cancel an arbitrary set of signals. For example, any of the signals can be detected after canceling all other signals, not just those that are stronger.

Also, the invention has been described in the context of detecting all the signals present. In practice, the receiver may be only interested in a subset of the signals. It will be apparent to one of ordinary skill in the art how detection of signals not in the subset of signals of interest can be omitted.

The present invention is also applicable to multi-rate systems, such as Wideband CDMA (WCDMA), in which different users use different spreading factors. For example, suppose the first user spreads using four chips per symbol whereas the second user spreads using twelve chips per symbol. If the first user were synchronized to the second user, then the second user would be orthogonalized with respect to a first user equivalent sequence that was the concatenation of three first user symbols.

Conversely, if the first user had twelve chips per symbol and the second user had four chips per symbol, one of two approaches would be used with the present invention. In the first approach, each second user symbol would be detected separately. The equivalent sequence for user 1 could be a fraction of user 1's symbol. In the second approach, multiple symbols of user 2 would be detected together, giving rise to a set of equivalent sequences for user 2 that are the concatenation of user 2 symbol sequences, in which different hypothesized bit values would be used. For example, if a and b are the symbol sequences for user 2 for symbol periods a and b, the equivalent sequences a|b and a|–b could be used to detect the two bits corresponding to the two symbol periods.

Thus, in accordance with the invention, successive cancellation using multiple signal timings is used to reduce complexity of successive cancellations with orthogonalization for direct sequence CDMA signals. For each signal image being demodulated, the processing is performed using one sample per chip to reduce receiver complexity.

I claim:

1. A baseband processor in a direct sequence CDMA receiver comprising:
   a subsampler receiving an oversampled signal and subsampling the oversampled signal in accordance with timing information to produce a chip-sampled signal;
   a buffer for storing said chip-sampled signal to produce a buffered signal;
   a correlator for correlating said buffered signal with spreading codes to produce despread values;
   an equivalent code generator for generating equivalent codes using said timing information and information about user spreading codes;
   a processor for processing said equivalent codes to produce orthogonalized codes;
   a spreader for spreading said despread values using said orthogonalized codes to produce respread signals; and
   a subtractor for subtracting said respread signals from said buffered signal to produce an updated buffered signal.

2. The baseband processor of claim 1 wherein the equivalent code generator interpolates user spreading codes.

3. The baseband processor of claim 1 wherein the equivalent code generator concatenates codes from different symbol periods using detected symbol values.

4. The baseband processor of claim 1 wherein the processor comprises a Gram-Schmidt processor.

5. The baseband processor of claim 1 wherein the correlator correlates to component codes to produce component correlations and combines component correlations to produce the despread values.

6. A direct sequence CDMA receiver comprising:
   means for receiving a sampled signal;
   means for subsampling the sampled signal in accordance with timing information to produce a chip-sampled signal;
   means for generating equivalent codes using said timing information and information about user spreading codes;
   means for processing said equivalent codes to produce an orthogonalized code; and
   means for correlating said chip-sampled signal with said orthogonalized code to produce a despread value.

7. The receiver of claim 6 wherein the generating means comprises means for interpolating user spreading codes.

8. The receiver of claim 6 wherein the generating means comprises means for concatenating codes from different symbol periods using detected symbol values.

9. The receiver of claim 6 wherein the processing means includes a Gram-Schmidt processor.

10. The receiver of claim 6 wherein the correlating means comprises means for correlating to component codes to produce component correlations and means for combining component correlations to produce the despread value.

11. The receiver of claim 6 wherein said correlating means produces plural despread values and further comprising means for combining despread values to produce combined despread values.

12. The receiver of claim 11 wherein the combining means corresponds to combining despread values from different signal echoes.

13. The receiver of claim 11 wherein the combining means corresponds to combining despread values from different antennas.

14. The receiver of claim 11 wherein the generating means generates equivalent codes corresponding to different echoes of a user's signal.

15. A direct sequence CDMA receiver comprising:
   means for receiving a sampled signal;
   means for subsampling the sampled signal in accordance with timing information to produce a chip-sampled signal;
   means for storing said chip-sampled signal to produce a buffered signal;
   means for correlating said buffered signal with spreading codes to produce despread values;
   means for generating equivalent codes using said timing information and information about user spreading codes;

means for processing said equivalent codes to produce orthogonalized codes;

means for spreading said despread values using said orthogonalized codes to produce respread signals; and means for subtracting said respread signals from said buffered signal to produce an updated buffered signal.

16. The receiver of claim 15 wherein the generating means comprises means for interpolating user spreading codes.

17. The receiver of claim 15 wherein the generating means comprises means for concatenating codes from different symbol periods using detected symbol values.

18. The receiver of claim 15 wherein the processing means includes a Gram-Schmidt processor.

19. The receiver of claim 15 wherein the correlating means comprises means for correlating to component codes to produce component correlations and means for combining component correlations to produce the despread values.

20. The method of detecting transmitted symbols in a direct sequence CDMA receiver comprising the steps of:

receiving a sampled signal;

subsampling the sampled signal in accordance with timing information to produce a chip-sampled signal;

generating equivalent codes using said timing information and information about user spreading codes;

processing said equivalent codes to produce an orthogonalized code; and correlating said chip-sampled signal with said orthogonalized code to produce a despread value.

21. The method of claim 20 wherein the generating step comprises interpolating user spreading codes.

22. The method of claim 20 wherein the generating step comprises concatenating codes from different symbol periods using detected symbol values.

23. The method of claim 20 wherein the processing step utilizes a Gram-Schmidt processor.

24. The method of claim 20 wherein the correlating step comprises correlating to component codes to produce component correlations and combining component correlations to produce the despread value.

25. The method of claim 20 wherein said correlating step produces plural despread values and further comprising the step of combining despread values to produce combined despread values.

26. The method of claim 25 wherein the combining step corresponds to combining despread values from different signal echoes.

27. The method of claim 25 wherein the combining step corresponds to combining despread values from different antennas.

28. The method of claim 25 wherein the generating step generates equivalent codes corresponding to different echoes of a user's signal.

29. The method of detecting transmitted symbols in a direct sequence CDMA receiver comprising the steps of:

receiving a sampled signal;

subsampling the sampled signal in accordance with timing information to produce a chip-sampled signal;

storing said chip-sampled signal to produce a buffered signal;

correlating said buffered signal with spreading codes to produce despread values;

generating equivalent codes using said timing information and information about user spreading codes;

processing said equivalent codes to produce orthogonalized codes;

spreading said despread values using said orthogonalized codes to produce respread signals; and subtracting said respread signals from said buffered signal to produce an updated buffered signal.

30. The method of claim 29 wherein the generating step comprises interpolating user spreading codes.

31. The method of claim 29 wherein the generating step comprises concatenating codes from different symbol periods using detected symbol values.

32. The method of claim 29 wherein the processing step uses a Gram-Schmidt processor.

33. The method of claim 15 wherein the correlating step comprises correlating to component codes to produce component correlations and combining component correlations to produce the despread values.

34. A baseband processor in a direct sequence CDMA receiver comprising:

a subsampler receiving an oversampled signal and subsampling the oversampled signal in accordance with timing information to produce a chip-sampled signal;

an equivalent code generator for generating equivalent codes using said timing information and information about user spreading codes;

a processor for processing said equivalent codes to produce an orthogonalized code; and a correlator operatively connected to the processor and the subsampler for correlating said chip-sampled signal with said orthogonalized code to produce a despread value.

35. The baseband processor of claim 34 wherein the equivalent code generator interpolates user spreading codes.

36. The baseband processor of claim 34 wherein the equivalent code generator concatenates codes from different symbol periods using detected symbol values.

37. The baseband processor of claim 34 wherein the processor comprises a Gram-Schmidt processor.

38. The baseband processor of claim 34 wherein the correlator correlates to component codes to produce component correlations and combines component correlations to produce the despread value.

39. The baseband processor of claim 34 wherein the correlator produces plural despread values and combines despread values to produce combined despread values.

40. The baseband processor of claim 39 wherein the correlator combines despread values from different signal echoes.

41. The baseband processor of claim 39 wherein the correlator combines despread values from different antennas.

42. The baseband processor of claim 39 wherein the equivalent code generator generates equivalent codes corresponding to different echoes of a user's signal.

* * * * *